United States Patent [19]

Chamay et al.

[11] Patent Number: 5,725,180
[45] Date of Patent: Mar. 10, 1998

[54] AIRCRAFT ENGINE PITOT PLENUM INTAKE

[75] Inventors: Anthony J. Chamay, Marblehead, Mass.; Isaac Zelazny, Pusanjin-Ku, Rep. of Korea

[73] Assignee: General Electric Company, Cincinnati, Ohio

[21] Appl. No.: 581,708

[22] Filed: Dec. 29, 1995

[51] Int. Cl.⁶ .................. B64D 33/02; F02C 7/05
[52] U.S. Cl. .................................................. 244/53 B
[58] Field of Search ..................... 244/53 B, 65; 60/751, 39.092

[56] References Cited

U.S. PATENT DOCUMENTS

| | | | |
|---|---|---|---|
| 2,541,170 | 2/1951 | Mayers et al. | 60/751 |
| 4,098,073 | 7/1978 | Adkins et al. | 60/751 X |
| 4,456,458 | 6/1984 | Gilbertson | 244/53 B X |
| 4,617,028 | 10/1986 | Ray et al. | 60/39.092 X |
| 4,713,934 | 12/1987 | Pellow | 60/39.092 |
| 4,881,367 | 11/1989 | Flatman | 60/39.092 X |
| 5,483,791 | 1/1996 | Kotwal et al. | 244/53 B X |

*Primary Examiner*—William Grant
*Attorney, Agent, or Firm*—Andrew C. Hess; Nathan D. Herkamp

[57] ABSTRACT

An aircraft turboshaft engine intake includes an axial diffuser and a colinear plenum disposed in flow communication therewith for collecting diffuser air therefrom. A scroll is disposed radially below the plenum in flow communication therewith for accelerating the plenum air for discharge to the aircraft engine. In this arrangement, propeller air is diffused in the diffuser and collected in the plenum wherein it is turned radially inwardly and accelerated through the scroll into the engine. Diffusion is uncoupled from air turning for improving the efficiency thereof.

10 Claims, 3 Drawing Sheets

AIRCRAFT ENGINE PITOT PLENUM INTAKE

BACKGROUND OF THE INVENTION

The present invention relates generally to aircraft gas turbine engines, and, more specifically, to an intake therefor.

In a typical turboprop aircraft, a gas turbine engine has an output drive shaft joined to a reduction gearbox for powering propellers. The engine and gearbox are contained in a nacelle which provides an aerodynamically smooth interface for minimizing drag during flight operation of the aircraft. The gearbox is a relatively large component mounted forwardly of the engine, and therefore a suitable air intake is required for bypassing the gearbox and suitably channeling a portion of the propeller air into the engine wherein it is compressed and mixed with fuel and ignited for generating hot combustion gases which power the engine and in turn the propellers.

The aircraft inlet must be suitably designed for channeling the propeller air into the engine with minimal aerodynamic losses. Since the gearbox obstructs direct access to the engine inlet, the air intake is laterally offset from the engine and its coaxial drive shaft which complicates the aerodynamic design thereof. The resulting air intake is typically S-shaped for turning the air from an initially axial direction radially inwardly toward the engine inlet where again it is turned axially for being channeled thereto. The profile of the turning intake must be carefully selected to avoid undesirable flow separation of the channeled air which would create pressure losses. And, the intake air must also be suitably channeled to the engine inlet with a circumferentially uniform profile for ensuring effective operation of the engine.

A conventional air intake is also typically configured for diffusing the propeller air for increasing its pressure or reducing the velocity thereof, which is made more complex in view of the S-shaped intake flowpath. The resulting intake designs are typically relatively large for providing effecting diffusion without undesirable flow separation. The design is also relatively axially long which increases the wetted surface area of the nacelle, and corresponding aerodynamically drag therefrom, as well as increasing the overall weight of the aircraft. The larger intake can therefore ingest relatively large birds or other foreign objects, which requires yet further complexity in the intake and engine design for ensuring effective operation without undesirable damage in the event of bird ingestion.

SUMMARY OF THE INVENTION

An aircraft turboshaft engine intake includes an axial diffuser and a colinear plenum disposed in flow communication therewith for collecting diffuser air therefrom. A scroll is disposed radially below the plenum in flow communication therewith for accelerating the plenum air for discharge to the aircraft engine. In this arrangement, propeller air is diffused in the diffuser and collected in the plenum wherein it is turned radially inwardly and accelerated through the scroll into the engine. Diffusion is uncoupled from air turning for improving the efficiency thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
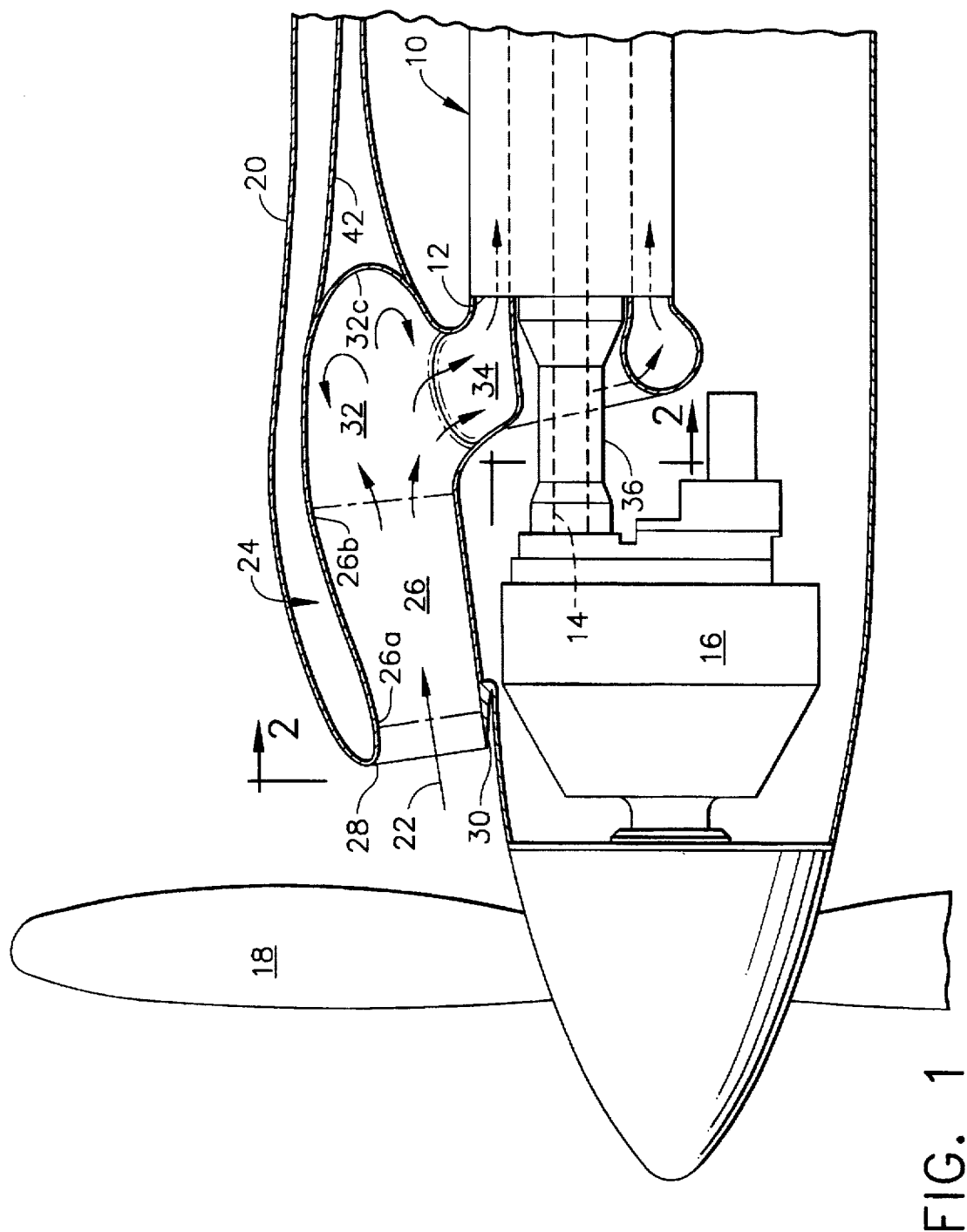
FIG. 1 is an elevational, partly sectional and schematic view of an aircraft gas turbine turboshaft engine driving a propeller through a gearbox, and including an air intake in a nacelle in accordance with one embodiment of the present invention.

Illustrated in FIG. 1 is a portion of an aircraft having a conventional gas turbine turboshaft engine 10 conventionally mounted to an aircraft wing for powering the aircraft in flight. The engine 10 includes an annular inlet 12 and has a coaxial output drive shaft or torque tube 14 which extends axially forwardly therefrom for providing output shaft power from the engine 10. A conventional gearbox 16 is suitably joined to the drive shaft 14, and in turn conventionally drives a propeller 18 joined thereto. The engine 10 and gearbox 16 are housed within a suitable nacelle 20 for reducing aerodynamic drag therefrom as the aircraft is powered in flight.

The engine 10 rotates the propeller 18 for creating propeller air 22 which is used for producing thrust for powering the aircraft in flight, and a portion of the propeller air 22 is channeled into an air intake 24 in accordance with one embodiment of the present invention wherein it is suitably channeled to the engine inlet 12. Since the gearbox 16 and drive shaft 14 are disposed at the front of the engine 10, the intake 24 is spaced or offset radially outwardly from the drive shaft 14 and the corresponding axial centerline axis of the engine 10, and is generally parallel thereto. Accordingly, the intake 24 must suitably redirect the propeller intake air 22 to suitably feed the engine inlet 12. In the exemplary embodiment illustrated in FIG. 1, the intake 24 is mounted vertically atop the gearbox 16, but it also may be positioned at any other suitable location such as at the bottom of the gearbox 16 if desired.

In accordance with the present invention, the intake 24 includes a simple, relatively high area ratio axial diffuser 26 for diffusing the propeller intake air 22 primarily only in the axial direction for increasing the pressure thereof by decreasing the velocity thereof without undesirable flow separation. The diffuser 26 includes a forwardly facing axial inlet 26a at the forward end thereof for receiving the propeller air 22, and an aft facing axial outlet 26b at the opposite, aft end thereof for discharging diffused air in an axially aft direction. The diffuser 26 is disposed generally parallel to and is radially offset from the drive shaft 14 for clearing the gearbox 16, and has a relatively high area ratio within the preferred range of about 1.4–2.0 of the flow area at the outlet 26b divided by the minimum flow area at the throat or inlet 26a. The diffuser 26 is a simple axial diffuser and is configured for maximum diffusion performance in a relatively small and compact diffuser, since turning of the air radially inwardly for flow to the offset engine inlet 12 is not performed by the diffuser 26 itself.

The intake 24 preferably also includes a conventional inlet lip or bellmouth 28 for smoothly receiving the air 22 from the propeller 18 during operation. The bellmouth 28 is provided at the entrance to the diffuser 26 at the top and both sides thereof, and a conventional diverter plate 30 forms a leading edge at the bottom of the diffuser 26 which is spaced radially outwardly from a portion of the nacelle disposed immediately downstream of the propeller 18 which conventionally diverts away the undesirable boundary layer of air formed at the root of the propeller blades.

Figure 2:
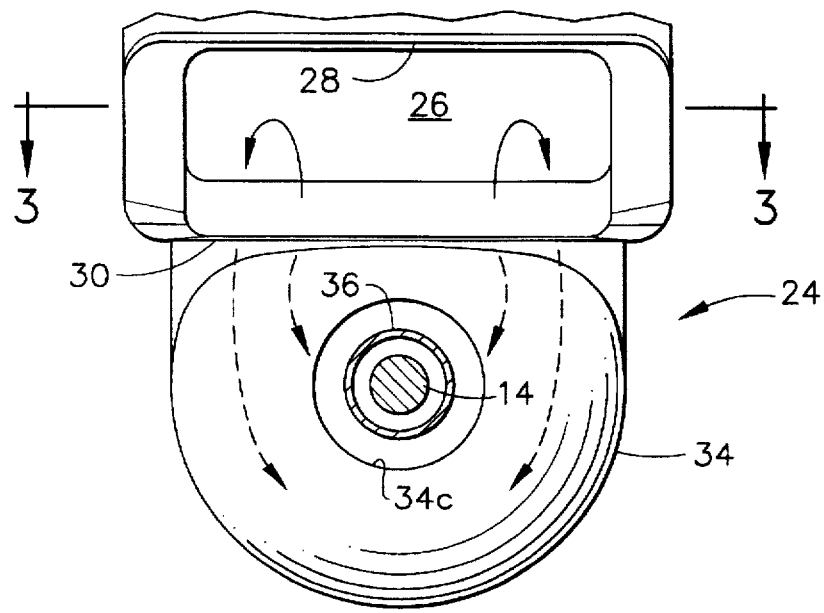
FIG. 2 is an aft facing view of the air intake illustrated in FIG. 1 and taken generally along line 2—2.
Figure 3:
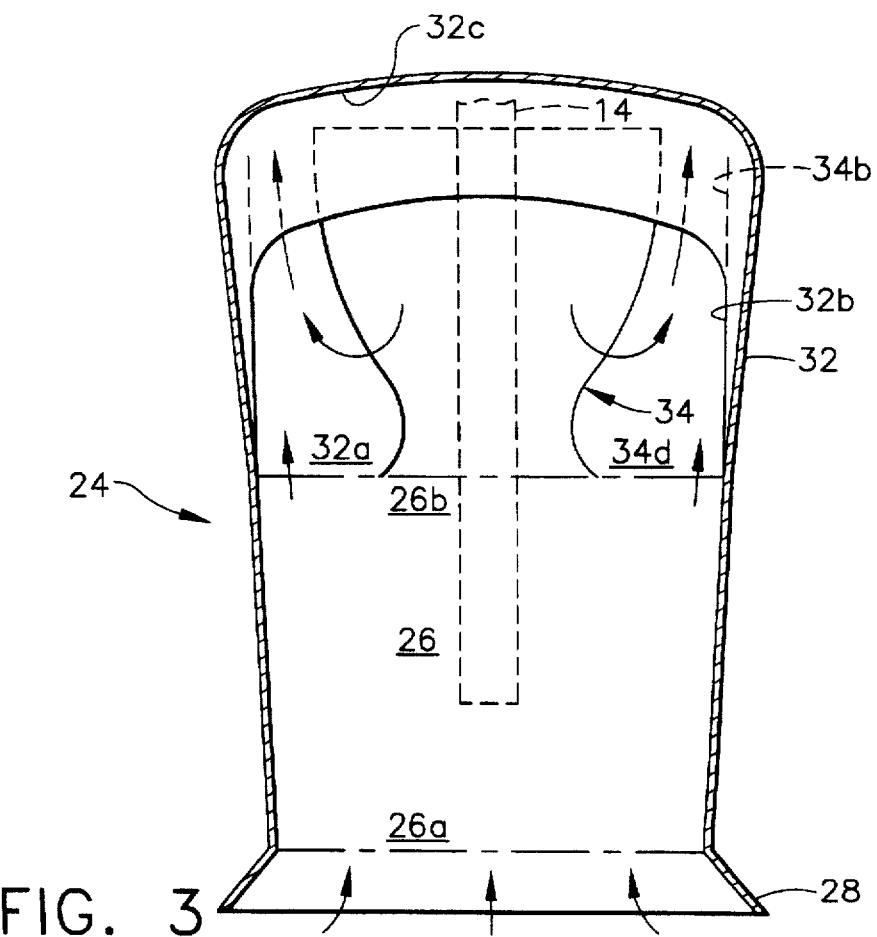
FIG. 3 is a top, partly sectional view of the air intake illustrated in FIG. 2 and taken generally along line 3—3.

Disposed downstream in turn from the diffuser 26 is a plenum or flow collection box 32 and an annular scroll 34. FIG. 2 is an aft facing elevational view of the intake 24, and FIG. 3 is a top, partly sectional view of the intake 24 showing the diffuser 26, plenum 32, and scroll 34 in more particularity.

Figure 4:
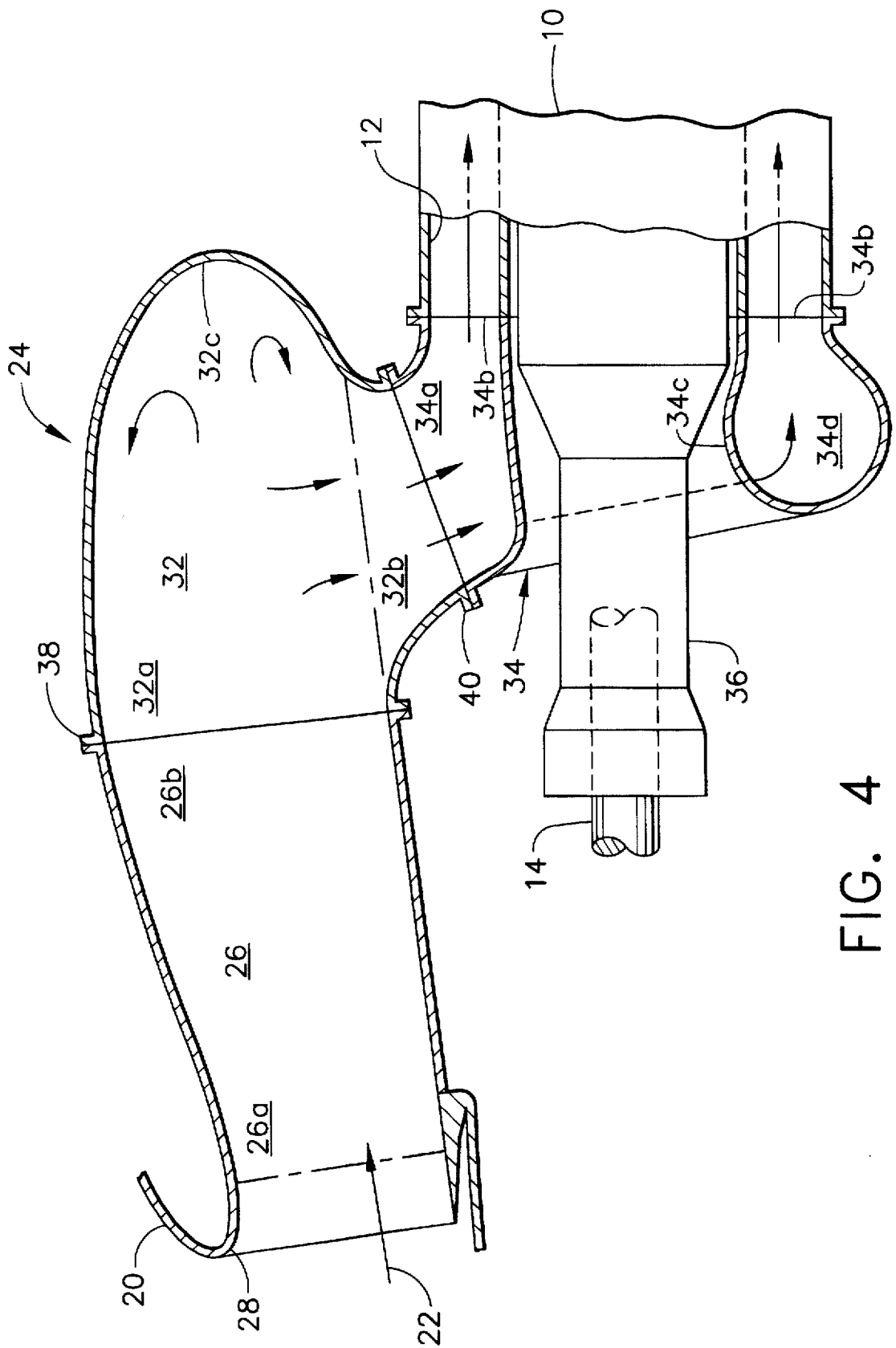
FIG. 4 is an enlarged, elevational, partly sectional view of the air intake illustrated in FIG. 1.

FIG. 4 is an enlarged elevational sectional view of the intake 24 showing the several components cooperating together. The plenum 32 is disposed colinear with the diffuser 26 and in axial flow communication therewith for receiving and collecting the diffuser air therefrom. The plenum 32 also turns the collected air radially inwardly into the scroll 34. The plenum 32 includes a forward facing axial inlet 32a which is coextensive with the diffuser outlet 26b, and a radially inwardly facing bottom outlet 32b which adjoins the plenum inlet 32a at the inner flowpath of the diffuser 26. In this way, the plenum 32 is effective for colinearly collecting the axially diffused air from the diffuser 26 in primarily only the axial direction, and then turning the collected air primarily only radially inwardly for discharge through the plenum bottom outlet 32 into the scroll 34. The collecting and turning steps of the airflow process are therefore accomplished sequentially with the diffusing step to uncouple axial diffusion in the diffuser 26 from the collecting and turning steps in the single component plenum 32.

The plenum 32 is preferably in the form of a dump diffuser abruptly increasing in flow area for reducing velocity of the diffuser air received from the diffuser 26 for reducing turning and dumping pressure losses of the plenum air inside the plenum 32 itself. As shown in FIG. 3, the plenum 32 may laterally diverge in the axially aft direction for effecting a substantially greater area ratio than that of the diffuser 26 itself for providing dump diffusion with attendant flow separation from the walls thereof. In the axial diffuser 26, maximum diffusion is desired without flow separation for providing efficient recovery of pressure from the fast moving propeller air 22. In the plenum 32, most of the diffusion has already occurred in the diffuser 26 and therefore flow separation in the plenum 32 occurs at relatively low velocity, with relatively low pressure losses due to dumping of the flow therein and due to turning of the flow radially inwardly into the scroll 34. In this way, diffusion of the airflow is uncoupled from turning of the airflow in order to bypass the gearbox 16 and redirect the air into the engine inlet 12.

Both the diffuser 26 and plenum 32 are coaxially or colinearly aligned with each other for providing a straight flowpath for the incoming propeller air 22 analogous to a conventional Pitot tube which faces directly upstream with an axially facing inlet. The resulting uncoupled air intake 24 has substantially higher diffusion efficiency than that typically found in a conventional S-shaped air intake in which diffusion occurs along the S-shaped channel with little or no flow separation therefrom. The higher efficiency, straight axial diffuser 26 may therefore be made with a relatively smaller inlet 26a for a given mass flowrate, with a correspondingly higher throat Mach number, with acceptable pressure recovery in the diffuser 26, and with relatively low discharge velocity into the plenum 32.

The entire intake 24 may therefore be made substantially smaller than a conventional S-shaped design which is simpler, lower in weight, and has reduced aerodynamic drag in view of the smaller nacelle 22 required for containing the intake 24. The smaller diffuser inlet 26a also means that larger birds are not likely to be ingested therein which decreases the complexity and strength required for accommodating bird ingestion.

The compact design also means that the gearbox 16 illustrated in FIG. 1 may be positioned more closely axially to the engine 10 with a shorter drive shaft 14 since the primarily axial flow of the air 22 through the diffuser 26 is in turn turned abruptly radially inwardly into the scroll 34 which reduces the axial length required therefor. As shown in FIG. 4, the scroll 34 includes a radially outwardly facing inlet 34a which is coextensive with the plenum outlet 32b, and an axially aft facing annular outlet 34b disposed coaxially with a central passage or bore 34c. The scroll bore 34c coaxially receives the drive shaft 14 in a conventional tubular fairing 36 therefor. Both the diffuser 26 and the plenum 32 are positioned radially above the scroll bore 34c to effect a relatively compact combination. The gearbox 16 may be positioned as closely as possible to the engine inlet 12 while providing sufficient room for the scroll 34 therebetween. The diffuser 26 and plenum 32 may then be positioned radially outwardly thereabove and are not affected by the position of the gearbox 16.

As illustrated in FIG. 4, the plenum 32 is preferably removably joined to both the diffuser 26 and the scroll 34 in a modular assembly so that differently configured plenums may be used with the same diffuser 26 and scroll 34. A first mating flange 38 is provided between the diffuser 26 and plenum 32 at the respective outlet 26b and inlet 32a thereof, and includes suitable fasteners, such as nuts and bolts, for allowing assembly and disassembly thereof. Similarly, a second mating flange 40 is provided at the juncture of the plenum 32 and the scroll 34 at the corresponding outlet 32b and inlet 34a thereof for similarly allowing assembly and disassembly thereof.

Since high efficiency diffusion is provided by the simple and compact axial diffuser 26, the plenum 32 which is a simple flow collection box for feeding and turning air into the scroll 34 may take any suitable configuration with substantial variations thereof. Accordingly, the plenum 32 may be changed in configuration as desired for fitting various different aircraft applications while retaining effective intake performance through the use of the diffuser 26 and scroll 34.

As shown in FIG. 4, the plenum 32 preferably also includes an aft, concave-inward wall 32c which adjoins the plenum outlet 32b and is disposed colinearly with, or in line-of-sight with, the diffuser 26 radially above and axially aft of the plenum outlet 32b. The aft wall 32c faces axially forwardly for providing an aerodynamically smooth turning surface for receiving the diffuser air and for channeling it radially inwardly through the plenum outlet 32b.

In the exemplary embodiment illustrated in FIG. 1, a debris channel 42 may be provided and extend axially aft from the plenum aft wall 32c for receiving foreign objects such as small birds channeled axially straight through the diffuser 26 and the plenum 32 and bypassing the scroll 34. The plenum aft wall 32c may have a suitable aperture therethrough in flow communication with the debris channel 42 if desired, and the aft end of the debris channel 42 may include a suitable access door which would typically be normally closed for preventing flow of air therethrough. The plenum aft wall 32c may be closed and formed of relatively thin material so that ingestion of a suitably sized bird would rupture the wall in this region for allowing the bird to be captured and retained in the debris channel 42 if desired.

Referring again to FIG. 4, the scroll 34 is preferably configured for accelerating the turned air received from the plenum 32 and discharging the accelerated air axially into the engine inlet 12 for meeting the airflow requirements of the engine 12 during operation. The scroll 34 preferably further includes a generally semi-circular sectioned annulus 34d disposed coaxially with the scroll bore 34c for splitting the plenum air into two circumferentially opposite paths around the scroll bore 34c and out through the scroll common outlet 34b. The scroll annulus 34d preferably converges from the scroll inlet 34a to the outlet 34b for accelerating the scroll air into the engine inlet 12. In this way accelerated air is provided to the engine inlet 12 uniformly around the circumference thereof as needed for the varying operation of the engine. As the engine requires mass flow, it simply draws the required airflow from the plenum 32 which is suitably provided with diffused air from the diffuser 26 received from the intake bellmouth 28.

Although a single diffuser 26 and cooperating plenum 32 are illustrated in the preferred embodiment, additional ones thereof may be circumferentially spaced apart from each other to feed a common scroll 34. Multiple small diffusers 26 may decrease the overall size of the air intake 24 providing additional size and weight advantage where desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An intake for channeling air flowing past a propeller to an inlet of an aircraft engine driving the propeller through a gearbox and drive shaft comprising:

an axial diffuser for diffusing said air, and having an inlet for receiving said air, and an outlet at an opposite end for discharging said air;

a plenum disposed colinearly with said diffuser in flow communication therewith for collecting said air therefrom and turning said air radially inwardly along an aft wall thereof; and a converging scroll disposed radially inwardly from said plenum in flow communication therewith for accelerating said air, and configured to coaxially join said engine inlet for channeling said air thereto.

2. An intake according to claim 1 wherein said plenum includes an inlet being coextensive with said diffuser outlet, and a radially inwardly facing outlet adjoining said plenum inlet for turning said air radially inwardly into said scroll.

3. An intake according to claim 2 wherein said plenum is in the form of a dump diffuser increasing in flow area for reducing velocity of said air to reduce turning and dumping pressure losses of said air.

4. An intake according to claim 3 wherein said scroll includes a central bore for coaxially receiving said drive shaft, and both said axial diffuser and plenum are positioned radially outwardly from said scroll bore.

5. An intake according to claim 4 wherein said scroll includes a radially outward facing inlet being coextensive with said plenum outlet, and an axially aft facing annular outlet disposed coaxially with said scroll bore.

6. An intake according to claim 5 wherein said scroll further includes a generally semi-circular annulus disposed coaxially with said scroll bore for splitting said air into two circumferentially opposite paths around said scroll bore and out said scroll outlet.

7. An intake according to claim 6 wherein said scroll annulus converges from said scroll inlet to said scroll outlet for accelerating said air into said engine inlet.

8. An intake according to claim 3 wherein said plenum is removably joined to both said axial diffuser and scroll in a modular assembly so that differently configured plenums may be used with the same diffuser and scroll.

9. An intake according to claim 3 wherein said plenum aft wall is concave and adjoins said plenum outlet and is disposed colinearly with said diffuser radially outwardly and axially aft of said plenum outlet.

10. An intake according to claim 9 further ocmprising a channel extending axially aft from said plenum aft wall for receiving foreign objects channeled axially straight through said diffuser and plenum, and bypassing said scroll.

* * * * *